(12) United States Patent
Takei et al.

(10) Patent No.: US 9,941,776 B2
(45) Date of Patent: Apr. 10, 2018

(54) CASE STRUCTURE FOR DRIVING APPARATUS

(71) Applicant: HONDA MOTOR CO., LTD., Tokyo (JP)

(72) Inventors: Hiroshi Takei, Wako (JP); Takashi Fukuda, Wako (JP); Eiichiro Urabe, Wako (JP); Tatsuya Noda, Wako (JP); Jun Masuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 496 days.

(21) Appl. No.: 14/590,997

(22) Filed: Jan. 7, 2015

(65) Prior Publication Data

US 2015/0236573 A1 Aug. 20, 2015

(30) Foreign Application Priority Data

Feb. 17, 2014 (JP) ................................. 2014-027217

(51) Int. Cl.
*H02K 16/00* (2006.01)
*H02K 5/22* (2006.01)
*H02K 51/00* (2006.01)
*H02K 5/04* (2006.01)
*H02K 5/173* (2006.01)
(Continued)

(52) U.S. Cl.
CPC ............ *H02K 16/00* (2013.01); *B60L 11/123* (2013.01); *B60L 11/14* (2013.01); *H02K 5/04* (2013.01); *H02K 5/1732* (2013.01); *H02K 5/22* (2013.01); *H02K 7/116* (2013.01); *H02K 11/225* (2016.01); *H02K 51/00* (2013.01); *B60L 2220/50* (2013.01); *B60L 2270/145* (2013.01);
(Continued)

(58) Field of Classification Search
CPC . B60K 6/36; B60K 6/40; B60K 6/405; B60K 6/442; B60L 11/123; B60L 11/14; H02K 16/00; H02K 16/02
USPC ........................................... 310/112–114, 89
See application file for complete search history.

(56) References Cited

U.S. PATENT DOCUMENTS 5,691,584 A * 11/1997 Toida .................... B60K 7/0007
180/65.51
2002/0117908 A1 8/2002 Sanchez et al.
2011/0036652 A1* 2/2011 Honda .................... B60K 6/36
180/65.25

FOREIGN PATENT DOCUMENTS

| CN | 1361937 | 7/2002 |
|---|---|---|
| CN | 102007011 | 4/2011 |
| JP | 4958126 B2 | 6/2012 |

OTHER PUBLICATIONS

Chinese Office Action for corresponding CN Application No. 201410815324.0, dated Dec. 2, 2016.

* cited by examiner

*Primary Examiner* — Naishadh Desai
(74) *Attorney, Agent, or Firm* — Mori & Ward, LLP (57) ABSTRACT

A case structure to accommodate a driving apparatus including a first motor and a second motor includes a first case, a second case, a first joint portion, an intermediate case, a positioning portion, and a first end portion of a second rotor or a second rotary shaft of the second motor. A stator of the first motor is to be attached to the first case. The second case is joined to the first case. The first joint portion is provided by joining a first end surface of the first case and an end surface of the second case together. The intermediate case is disposed on an inner diameter side of the first joint portion and attached to a stator of the second motor and to the first (Continued)

case. The intermediate case is positioned at the positioning portion with respect to the second case.

12 Claims, 4 Drawing Sheets

(51) Int. Cl.
*H02K 7/116* (2006.01)
*B60L 11/12* (2006.01)
*B60L 11/14* (2006.01)
*H02K 11/225* (2016.01)

(52) U.S. Cl.
CPC .......... *Y02T 10/6217* (2013.01); *Y02T 10/641* (2013.01); *Y02T 10/7077* (2013.01)

CASE STRUCTURE FOR DRIVING APPARATUS

CROSS-REFERENCE TO RELATED APPLICATIONS

The present application claims priority under 35 U.S.C. § 119 to Japanese Patent Application No. 2014-027217, filed Feb. 17, 2014, entitled "Case Structure for Driving Apparatus." The contents of this application are incorporated herein by reference in their entirety.

BACKGROUND

1. Field

The present disclosure relates to a case structure for a driving apparatus.

2. Description of the Related Art

There is a driving apparatus for a hybrid vehicle that includes an engine and a motor in the related art. An example of such a driving apparatus is the driving apparatus for a hybrid vehicle that is described in Japanese Patent No. 4958126 (hereinafter referred to as "Patent Document 1") and that includes a generator motor, which is an electric motor that is mainly used for generating electricity, and a traction motor, which is an electric motor that mainly functions as a driving source of the vehicle, in addition to an engine that serves as a driving source.

The case structure described in Patent Document 1 is an example of a case structure for a vehicle driving apparatus such as that described above. In the case structure described in Patent Document 1, a second case on which the generator motor is mounted is interposed between a first case and a third case, and the three individual cases are arranged next to one another in an axial direction and joined to one another.

SUMMARY

According to one aspect of the present invention, a case structure for a driving apparatus includes a first motor, a second motor, and a case. The first motor includes a first rotary shaft, a rotor that rotates along with the first rotary shaft, and a stator that is disposed over an outer circumferential side of the rotor. The second motor includes a second rotary shaft that is disposed so as to be coaxial with the first rotary shaft, a rotor that rotates along with the second rotary shaft, and a stator that is disposed over an outer circumferential side of the rotor. The first motor and the second motor are accommodated in the case. The case includes a first case to which the stator of the first motor is attached, a second case that is joined to the first case, a first joint portion that is formed by joining a first end surface of the first case and an end surface of the second case together, an intermediate case that is attached to the first case and disposed on an inner diameter side of the first joint portion, and a positioning portion at which the intermediate case is positioned with respect to the second case. The stator of the second motor is attached to the intermediate case. A first end portion of the rotor or the second rotary shaft of the second motor is supported on the intermediate case with a first bearing. A second end portion of the rotor or the second rotary shaft of the second motor is supported on the second case with a second bearing.

According to another aspect of the present invention, a case structure to accommodate a driving apparatus including a first motor and a second motor includes a first case, a second case, a first joint portion, an intermediate case, a positioning portion, and a first end portion of a second rotor or a second rotary shaft of the second motor. A stator of the first motor is to be attached to the first case. The first motor includes a first rotary shaft, a rotor rotatable around the first rotary shaft, and the stator disposed to surround an outer circumferential surface of the rotor. The second case is joined to the first case. The first joint portion is provided by joining a first end surface of the first case and an end surface of the second case together. The intermediate case is disposed on an inner diameter side of the first joint portion and attached to a stator of the second motor and to the first case. The second motor includes the second rotary shaft coaxial with the first rotary shaft, the second rotor rotatable around the second rotary shaft, and the stator disposed to surround an outer circumferential surface of the second rotor. The intermediate case is positioned at the positioning portion with respect to the second case. The first end portion of the second rotor or the second rotary shaft of the second motor is supported on the intermediate case with a first bearing, and a second end portion of the second rotor or the second rotary shaft of the second motor is supported on the second case with a second bearing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
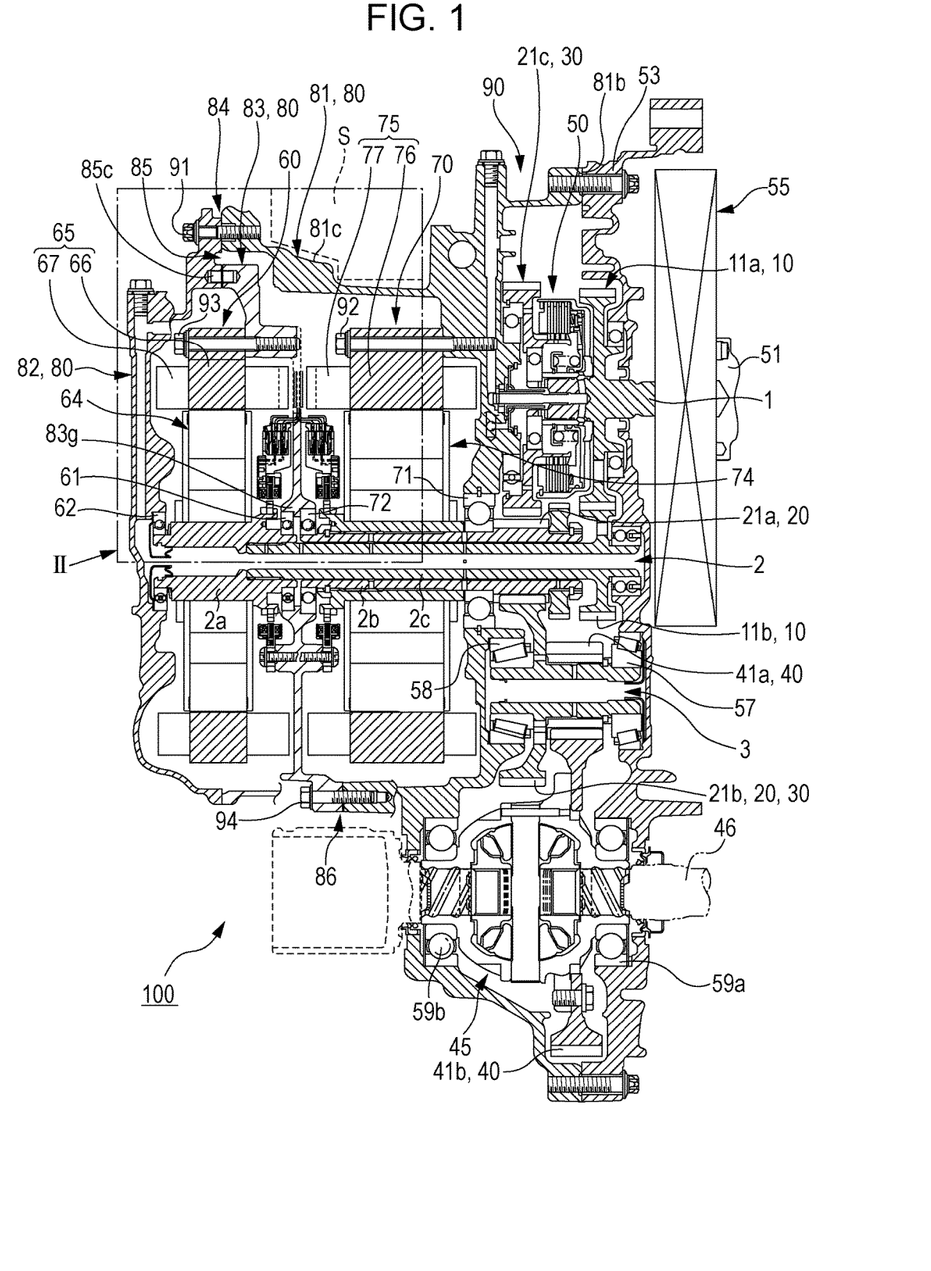
FIG. 1 is a main sectional view illustrating an exemplary overall configuration a driving apparatus that has a case structure according to an embodiment of the present disclosure.
Figure 2:
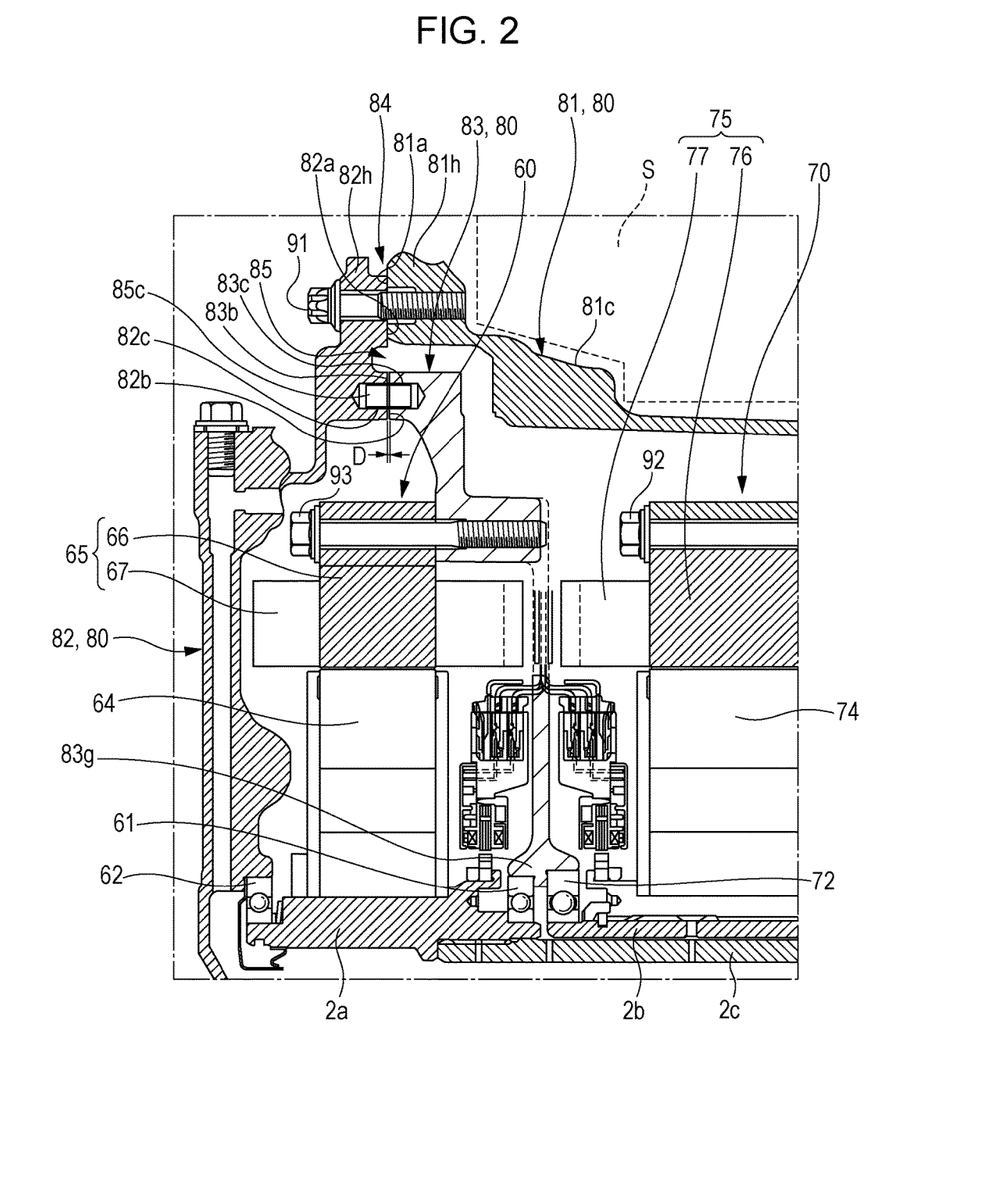
FIG. 2 is a partial enlarged view of a portion II in FIG. 1.
Figure 3:
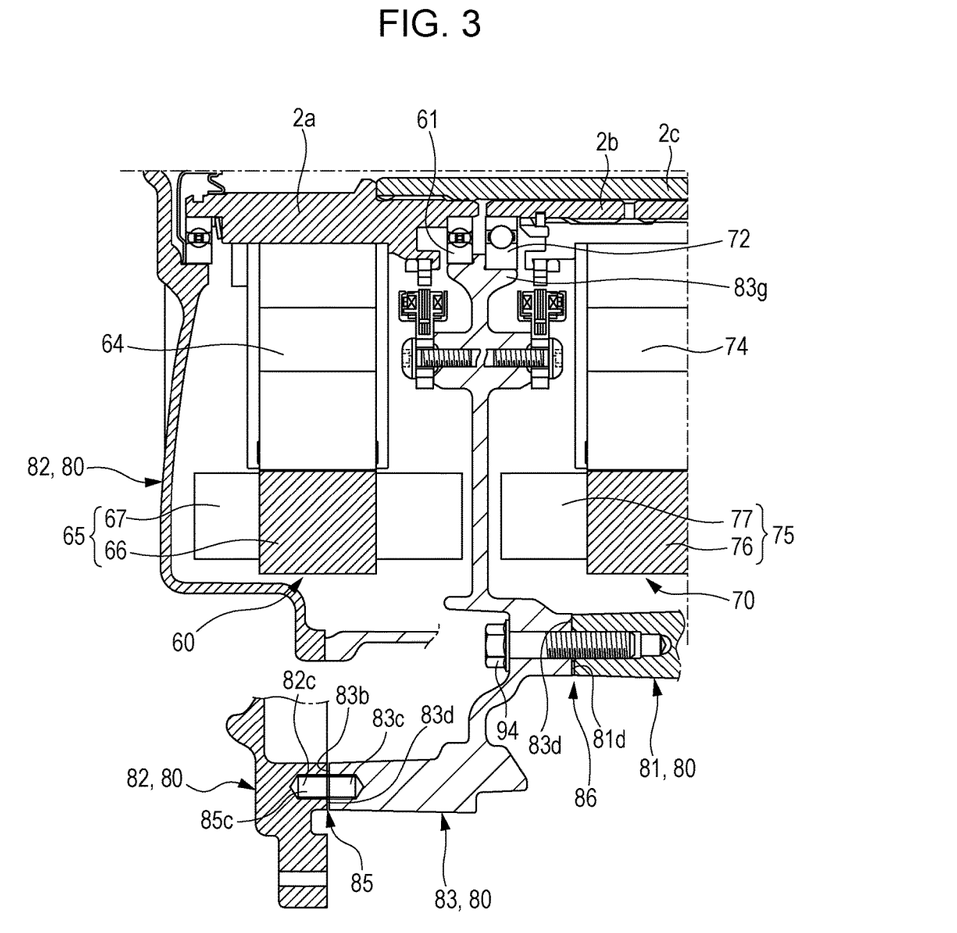
FIG. 3 is an enlarged sectional side view illustrating a portion of the driving apparatus.
Figure 4:
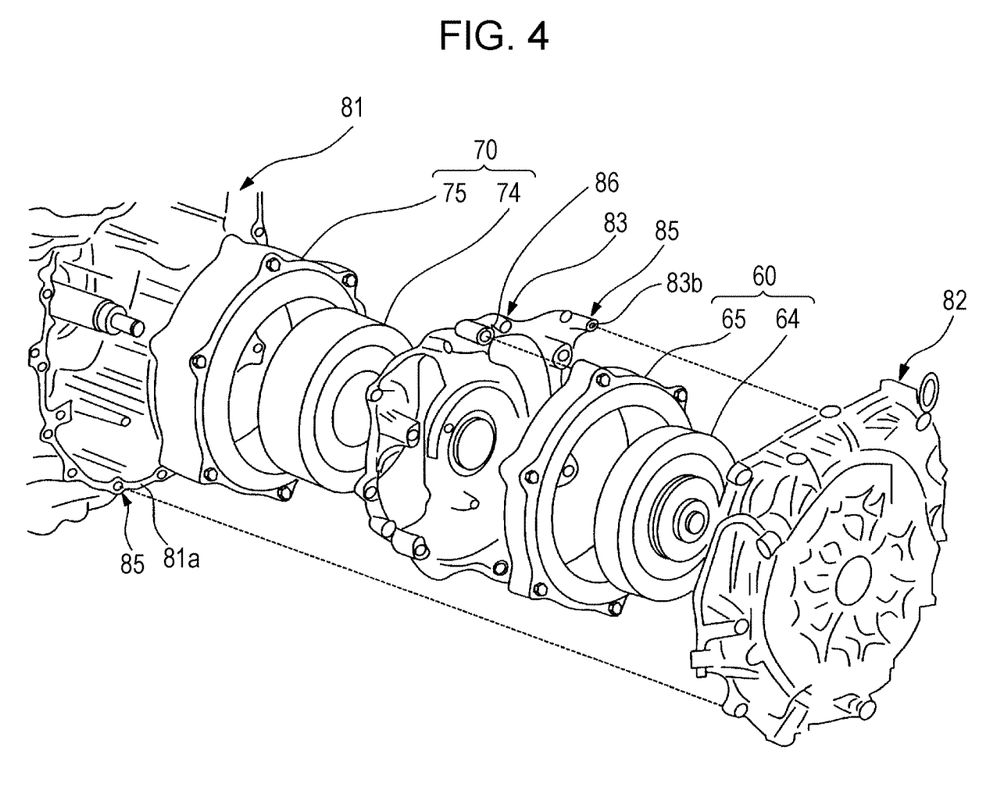
FIG. 4 is a schematic exploded perspective view illustrating components of the driving apparatus.

An embodiment of the present disclosure will be described in detail below with reference to the accompanying drawings. FIG. 1 is a main sectional view illustrating an exemplary overall configuration a driving apparatus 100 that has a case structure according to an embodiment of the present disclosure. FIG. 2 is a partial enlarged view of a portion II in FIG. 1. FIG. 3 is an enlarged sectional side view illustrating a portion of the driving apparatus 100. Note that the sectional view of FIG. 3 illustrates a cross section different from that illustrated in the sectional view of FIG. 1. FIG. 4 is a schematic exploded perspective view illustrating components of the driving apparatus 100. The driving apparatus 100 illustrated in these drawings is a driving apparatus for a hybrid vehicle that includes a drive transmission unit 90 that transmits a driving force from a crankshaft 51 of an engine (not illustrated), which is a driving source of the vehicle, a traction motor (first motor) 70, and a generator motor (second motor) 60. The drive transmission unit 90 includes an engine shaft 1, a motor-generator shaft (input shaft) 2, and an output shaft 3 that are arranged in parallel to one another at a predetermined pitch. The motor-generator shaft 2 includes an inner circumferential shaft 2a that is connected to the engine shaft 1 via a generator-drive gear train 10, a generator shaft 2c that is connected to the generator motor (hereinafter referred to as "generator") 60, and a hollow outer circumferential shaft designed for a motor (hereinafter referred to as "motor-outer-circumferential shaft") 2b that is disposed on the outer circumferential side of the inner circumferential shaft 2a in such a manner as to be coaxial with the inner circumferential shaft 2a and that is connected to the traction motor (hereinafter referred to as "motor") 70.

The inner circumferential shaft 2a and the generator shaft 2c are coaxially arranged next to each other. The motor-outer-circumferential shaft 2b is connected to the output shaft 3 via a motor-power-transmission gear train 20. The engine shaft 1 is connected to the output shaft 3 via an engine-power-transmission gear train 30, and a clutch 50 that is used for switching between a connected state and a released state of a power transmission path between the engine shaft 1 and the engine-power-transmission gear train 30 is disposed on a portion of the engine shaft 1 that is located closer to the crankshaft 51 than the engine-power-transmission gear train 30 is.

As a case structure in which the above-mentioned generator 60 and the motor 70 are accommodated, the driving apparatus 100 includes a case 80 that is formed of a motor case (first case) 81, a side cover (second case) 82, and an intermediate plate (intermediate case) 83 that is disposed in areas inside (on the inner diameter sides of) the motor case 81 and the side cover 82. The motor case 81, the side cover 82, and the intermediate plate 83 are arranged in this order from the side on which the crankshaft 51 is disposed (the right side as viewed in FIG. 1).

The engine shaft 1 is arranged so as to be coaxial with the crankshaft 51. The power of the crankshaft 51 is transmitted to the engine shaft 1 via a drive plate that is provided with a damper (not illustrated). An output gear 11a that forms part of the generator-drive gear train 10 is disposed on a center portion of the engine shaft 1 in the axial direction of the engine shaft 1, and the clutch 50 is arranged adjacent to the output gear 11a on the side opposite to that on which the crankshaft 51 is disposed.

The motor 70 includes a rotor 74 that has an inner circumferential end fixed on the motor-outer-circumferential shaft 2b and a stator 75 that is fixed on the motor case 81 and that is disposed over the outer circumferential side of the rotor 74 so as to face the rotor 74. The stator 75 includes a stator core 76 and a stator coil 77 that is wound around the stator core 76. The generator 60 includes a rotor 64 that has an inner circumferential end fixed on the generator shaft 2c and a stator 65 that is fixed on the intermediate plate 83 and that is disposed over the outer circumferential side of the rotor 64 so as to face the rotor 64. The stator 65 includes a stator core 66 and a stator coil 67 that is wound around the stator core 66.

An input gear 11b of the generator-drive gear train 10 is formed in an end portion of the inner circumferential shaft 2a on the side on which the crankshaft 51 is disposed. The input gear 11b engages with the output gear 11a on the engine shaft 1.

An output gear 21a of the motor-power-transmission gear train 20 is disposed at one end of the motor-outer-circumferential shaft 2b on the side on which the crankshaft 51 is disposed. The motor-outer-circumferential shaft 2b is supported on the motor case 81 with a bearing 71 that is arranged between the motor 70 and the output gear 21a. In addition, the other end of the motor-outer-circumferential shaft 2b on the side opposite to that on which the crankshaft 51 is disposed is supported on an inner diameter end 83g of the intermediate plate 83 with a bearing 72.

One end of the generator shaft 2c on the side on which the crankshaft 51 is disposed is supported on the inner diameter end 83g of the intermediate plate 83 with a bearing 61, and the other end of the generator shaft 2c on the side opposite to that on which the crankshaft 51 is disposed is supported on an inner surface of the side cover 82 with a bearing 62.

An output gear 41a of a final gear train 40 and an input gear 21b that forms part of the motor-power-transmission gear train 20 and the engine-power-transmission gear train 30 are disposed on the output shaft 3 in this order from the side on which the crankshaft 51 is disposed. The input gear 21b engages with an output gear 21c of the engine shaft 1 and the output gear 21a of the motor-outer-circumferential shaft 2b. One end of the output shaft 3 on the side on which the crankshaft 51 is disposed is supported on a dumper housing 53 with a bearing 57, and the other end of the output shaft 3 on the side opposite to that on which the crankshaft 51 is disposed is supported on the motor case 81 with a bearing 58.

A differential device 45 includes an input gear 41b of the final gear train 40. The input gear 41b engages with the output gear 41a on the output shaft 3. One end of the differential device 45 on the side on which the crankshaft 51 is disposed is supported on the dumper housing 53 with a bearing 59a, and the other end of the differential device 45 on the side opposite to that on which the crankshaft 51 is disposed is supported on the motor case 81 with a bearing 59b.

One end surface (open end) 81b of the motor case 81 in the axial direction of the motor case 81 (on the side on which the crankshaft 51 is disposed) is fixed on the dumper housing 53, and the side cover 82 is attached to the other end surface (open end) 81a of the motor case 81 so as to cover the end surface 81a. A joint portion (first joint portion) 84 is formed by joining the end surface 81a of the motor case 81 and an end surface 82a of the side cover 82 together. The joint portion 84 is formed by joining an outer circumferential edge 81h of the motor case 81 and an outer circumferential edge 82h of the side cover 82 together and fastening the outer circumferential edge 81h and the outer circumferential edge 82h to each other with a bolt 91. The joint portion 84 joins the motor case 81 and the side cover 82 together. In addition, the stator 75 of the motor 70 is fastened to the inner side of the motor case 81 with a bolt 92.

The intermediate plate 83 that is attached to the motor case 81 is disposed inside (on the inner diameter side of) the joint portion 84. As illustrated in FIG. 3, a joint portion (second joint portion) 86 is formed by joining an end surface 83d of the intermediate plate 83 that faces the motor case 81 and an end surface 81d of the motor case 81 that faces the intermediate plate 83 together and fastening the end surface 83d and the end surface 81d with a bolt 94. The joint portion 86 joins the motor case 81 and the intermediate plate 83 together. As illustrated in FIG. 2, the stator 65 of the generator 60 is fastened to the intermediate plate 83 with a bolt 93.

A positioning portion 85 is formed of an end surface (first surface) 83b of the intermediate plate 83 that faces the side cover 82 and an end surface (second surface) 82b of the side cover 82 that faces the end surface 83b. The positioning portion 85 has a cylindrical recess 83c that is open to the end surface 83b of the intermediate plate 83 and that extends in the axial direction of the intermediate plate 83 and a cylindrical recess 82c that is open to the end surface 82b of the side cover 82 and that extends in the axial direction of the side cover 82, and the positioning portion 85 includes a knock pin (columnar member) 85c having ends each of which is received in a corresponding one of the recess 83c and the recess 82c. In addition, in the positioning portion 85, a slight gap (clearance) D is formed between the end surface 83b of the intermediate plate 83 and the end surface 82b of the side cover 82. In other words, the end surface 83b and the end surface 82b are positioned in such a manner as to be spaced apart from each other in the axial directions. Positioning of the intermediate plate 83 with respect to the side cover 82 (positioning of the intermediate plate 83 in a radial direction) is performed by the positioning portion 85. As illustrated in FIG. 2 and FIG. 3, the positioning portion 85 is formed at a plurality of positions. In the present embodiment, the joint portion 84 and the positioning portions 85 are formed at the same position in an axial direction (the axial direction of the generator shaft 2c or the like).

In the case structure of the present embodiment, in the axial direction, the joint portion (first joint portion) 84, which joins the motor case 81 and the side cover 82 together, is located at a position (on the left side in FIG. 2) closer to the side cover 82 than the bearing (first bearing) 61, with which the right end of the inner circumferential shaft 2a is supported on the intermediate plate 83, is. As a result, the length dimension of the motor case 81 in the axial direction of the motor case 81 is relatively large, and a space S in which another device such as a power-source-driving device is to be mounted is secured in a top surface 81c of the motor case 81.

In other words, according to the case structure of the present embodiment, the top surface 81c of the motor case 81 can have a relatively large area by arranging the joint portion 84, at which the motor case 81 and the side cover 82 are joined together, to be offset toward the side cover 82. As a result, a layout space in which another device such as a power-source-driving device is to be mounted can be secured in the top surface 81c of the motor case 81. Therefore, in the case of trying to mount another device on an upper portion of the case 80, the device will not be mounted so as to extend across the first case 81 and the second case 82, and thus, sufficient rigidity of the driving apparatus 100 and stability of the other device that is mounted on the upper portion of the case 80 can be secured.

In the case structure for the driving apparatus 100 according to the present disclosure, the case 80 includes the motor case 81 to which the stator 75 of the motor 70 is attached, the side cover 82 that is joined to the motor case 81, and the intermediate plate 83 that is attached to the motor case 81 and disposed inside (on the inner diameter side of) the joint portion 84. The motor case 81 and the side cover 82 are arranged side-by-side along the axial direction, and the intermediate plate 83 is disposed on the inner diameter sides of the motor case 81 and the side cover 82. Therefore, compared with a case structure of the related art in which three cases are arranged side-by-side in an axial direction and joined together, the total length of the driving apparatus 100 including the case 80 in the axial direction can be reduced.

In addition, since only the joint portion 84, which joins the motor case 81 and the side cover 82 together, needs to have a seal structure, the number of portions on each of which such a seal structure is to be provided is smaller compared with the case structure in which each of the end surfaces (joint surfaces at either side in the axial direction) of the second case in the middle has a seal structure and which is described in Patent Document 1, the entire contents of which are incorporated herein by reference. As a result, work assembly of the case 80 will not take a large amount of time or effort, and thus, a reduction in the manufacturing costs of the case structure and the driving apparatus 100 can be achieved.

The stator 65 of the generator 60 is attached to the intermediate plate 83. One end of the inner circumferential shaft 2a, which supports the rotor 64 of the generator 60, is supported on the inner diameter end 83g of the intermediate plate 83 with the bearing 61, and the other end of the inner circumferential shaft 2a is supported on the side cover 82 with the bearing 62. In this state, the positioning portions 85, at each of which the intermediate plate 83 is directly positioned with respect to the side cover 82, are formed. As a result, the positioning accuracy (coaxial accuracy) of the stator 65 and the rotor 64 of the generator 60 can be improved.

In addition, according to the case structure of the present embodiment, in the positioning portions 85, at each of which the intermediate plate 83 is positioned with respect to the side cover 82, the gap (clearance) D is formed between the end surface 82b of the side cover 82 and the end surface 83b of the intermediate plate 83, so that vibration (film surface vibration) of the intermediate plate 83 that is generated due to driving of the driving apparatus 100 can be prevented from being transmitted to the side cover 82 while the intermediate plate 83 and the side cover 82 are positioned relative to each other (while a knock position is determined). Therefore, vibration and noise of the case 80 and the driving apparatus 100 can be effectively reduced.

Furthermore, according to the case structure of the present embodiment, the intermediate plate 83 is joined to the motor case 81 at the joint portion 86 and positioned with respect to the side cover 82 at the positioning portion 85, so that the positioning accuracy of the intermediate plate 83 can be improved.

In the case structure of the present embodiment in which the intermediate plate 83 is positioned with respect to the side cover 82 at the positioning portion 85, as illustrated in FIG. 4, an assembly structure in which the side cover 82, the intermediate plate 83, and the generator 60 are integrated with one another in a state where the generator 60 (the rotor 64 and the stator 65) is disposed between the side cover 82 and the intermediate plate 83 can be formed. As a result, simplification of an assembly process of the driving apparatus 100 can be achieved.

According to the case structure of the present embodiment, which has been described above, a reduction in the external dimensions of the driving apparatus 100 including the case 80, an improvement in the positioning accuracy of internal components, an improvement in mountability of another device on the upper portion of the case 80, and the like can be facilitated.

Although the embodiment of the present disclosure has been described above, the present disclosure is not limited to the above-described embodiment, and various modifications can be made within the scope of the claims and within the scope of the technical idea described in the specification and the drawings. For example, the specific shapes, dimension, and the like of the motor case 81, the side cover 82, and the intermediate plate 83 in the case structure for the driving apparatus 100, which have been described in the above embodiment, are examples, and the specific shapes and the like of the first case, the second case, and the intermediate case according to the present disclosure may be shapes and the like other than those described in the above embodiment.

In addition, the configuration of the positioning portion 85 that has been described in the above embodiment is an example. The specific configuration of the positioning portion according to the present disclosure, at which the intermediate case is positioned with respect to the second case, is not limited to the configuration of the positioning portion 85, which has been described in the above embodiment, and may be a different configuration. This holds true both in the joint portion (first joint portion) 84 and the joint portion (second joint portion) 86.

A case structure for a driving apparatus according to the present disclosure includes a first motor that includes a first rotary shaft, a rotor that rotates along with the first rotary shaft, and a stator that is disposed over an outer circumferential side of the rotor, a second motor that includes a second rotary shaft that is disposed so as to be coaxial with the first rotary shaft, a rotor that rotates along with the second rotary shaft, and a stator that is disposed over an outer circumferential side of the rotor, and a case in which the first motor and the second motor are accommodated. The case includes a first case to which the stator of the first motor is attached, a second case that is joined to the first case, a first joint portion that is formed by joining an end surface of the first case and an end surface of the second case together, an intermediate case that is attached to the first case and disposed on an inner diameter side of the first joint portion, and a positioning portion at which the intermediate case is positioned with respect to the second case. The stator of the second motor is attached to the intermediate case. A first end portion of the rotor or the second rotary shaft of the second motor is supported on the intermediate case with a first bearing, and a second end portion of the rotor or the second rotary shaft of the second motor is supported on the second case with a second bearing.

In the case structure for a driving apparatus according to the present disclosure, the case includes the first case to which the stator of the first motor is attached, the second case that is joined to the first case at the first joint portion, and the intermediate case that is attached to the first case and disposed on the inner diameter side of the first joint portion. The first case and the second case are arranged side-by-side along the axial direction, and the intermediate case is disposed on the inner diameter sides of the first case and the second case. Therefore, compared with a case structure of the related art in which three cases are arranged side-by-side in an axial direction and joined together, the total length of the driving apparatus including the case in the axial direction can be reduced.

In addition, since only the first joint portion, which joins the first case and the second case together, needs to have a seal structure, the number of portions on each of which such a seal structure is to be provided is smaller compared with the case structure of the related art in which each of the end surfaces (joint surfaces at either side in the axial direction) of the second case in the middle has a seal structure. As a result, work assembly of the case will not take a large amount of time or effort, and thus, a reduction in the manufacturing costs of the case structure can be achieved.

The stator of the second motor is attached to the intermediate case. The first end portion of the rotor or the second rotary shaft of the second motor is supported on the intermediate case with the first bearing, and the second end portion of the rotor or the second rotary shaft is supported on the second case with the second bearing. In this state, the positioning portion at which the intermediate case is directly positioned with respect to the second case is formed. As a result, the positioning accuracy (coaxial accuracy) of the stator and the rotor of the second motor can be improved.

In the case structure, the positioning portion may include a first surface of the intermediate case that faces the second case, a second surface of the second case that faces the first surface, and a columnar member and may have a first recess that is formed in the first surface and a second recess that is formed in the second surface, the columnar member having ends each of which is received in a corresponding one of the first recess and the second recess. In addition, the first surface and the second surface may be positioned with a gap therebetween.

According to the case structure, the gap (clearance) is formed between the first surface and the second surface, each of which forms part of the positioning portion, at which the intermediate case is positioned with respect to the second case, so that vibration of the intermediate case that is generated due to driving of the driving apparatus (vibration that is generated due to operation of the second motor) can be effectively prevented from being transmitted to the second case while positioning of the intermediate case with respect to the second case (positioning of the intermediate case in a radial direction) is performed. Therefore, vibration and noise of the case and the driving apparatus can be effectively reduced.

The case structure may further includes a second joint portion that is formed by joining a second end surface of the first case and an end surface of the intermediate case together.

According to the case structure, the intermediate case is joined to the first case at the second joint portion and positioned with respect to the second case at the positioning portion, so that the positioning accuracy of the intermediate case can be improved.

In the case structure, the position of the first joint portion in axial directions of the first rotary shaft and the second rotary shaft may be located closer to the second case than the position of the first bearing is.

According to the case structure, a top surface of the first case can have a relatively large area by arranging the joint portion, at which the first case and the second case are joined together, so to be offset toward the second case. As a result, a layout space in which another device is to be mounted can be secured in the top surface of the first case. Therefore, in the case of trying to mount another device on an upper portion of the case, the device will not be mounted so as to extend across the first case and the second case, and thus, sufficient rigidity of the driving apparatus and stability of the other device that is mounted on the upper portion of the case can be secured. Note that the reference numerals in parentheses in the above description are examples of the present disclosure and correspond to the reference numerals of components in an embodiment, which will be described later.

The case structure for a driving apparatus according to the present disclosure, a reduction in the external dimensions of the driving apparatus including the case, an improvement in the positioning accuracy of internal components, an improvement in mountability of another device on the upper portion of the case, and the like can be facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. A case structure for a driving apparatus comprising:
a first motor that includes a first rotary shaft, a rotor that rotates along with the first rotary shaft, and a stator that is disposed over an outer circumferential side of the rotor;
a second motor that includes a second rotary shaft that is disposed so as to be coaxial with the first rotary shaft, a rotor that rotates along with the second rotary shaft, and a stator that is disposed over an outer circumferential side of the rotor; and
a case in which the first motor and the second motor are accommodated,
wherein the case includes
a first case to which the stator of the first motor is attached,
a second case that is joined to the first case,
a first joint portion including a first end surface of the first case and an end surface of the second case that are directly joined to each other,
an intermediate case that is attached to the first case and disposed on an inner diameter side of the first joint portion, and
a positioning portion at which the intermediate case is positioned with respect to the second case,
wherein the stator of the second motor is attached to the intermediate case,
wherein a first end portion of the rotor or the second rotary shaft of the second motor is supported on the intermediate case with a first bearing, and a second end portion of the rotor or the second rotary shaft of the second motor is supported on the second case with a second bearing, and
wherein the first end surface of the first case and the end surface of the second case are in direct contact with each other at the first joint portion.

2. The case structure according to claim 1,
wherein the positioning portion includes a first surface of the intermediate case that faces the second case, a columnar member, and a second surface of the second case that faces the first surface, and has a first recess that is formed in the first surface and a second recess that is formed in the second surface, the columnar member having ends each of which is received in a corresponding one of the first recess and the second recess, and
wherein the first surface and the second surface are positioned in such a manner as to be spaced apart from each other.

3. The case structure according to claim 2, further comprising:
a second joint portion that is formed by joining a second end surface of the first case and an end surface of the intermediate case together.

4. A case structure for a driving apparatus comprising:
a first motor that includes a first rotary shaft, a rotor that rotates along with the first rotary shaft, and a stator that is disposed over an outer circumferential side of the rotor;
a second motor that includes a second rotary shaft that is disposed so as to be coaxial with the first rotary shaft, a rotor that rotates along with the second rotary shaft, and a stator that is disposed over an outer circumferential side of the rotor;
a case in which the first motor and the second motor are accommodated; and
a second joint portion that is formed by joining a second end surface of the first case and an end surface of the intermediate case together,
wherein the case includes
a first case to which the stator of the first motor is attached,
a second case that is joined to the first case,
a first joint portion including a first end surface of the first case and an end surface of the second case that are directly joined to each other,
an intermediate case that is attached to the first case and disposed on an inner diameter side of the first joint portion, and
a positioning portion at which the intermediate case is positioned with respect to the second case,
wherein the stator of the second motor is attached to the intermediate case,
wherein a first end portion of the rotor or the second rotary shaft of the second motor is supported on the intermediate case with a first bearing, and a second end portion of the rotor or the second rotary shaft of the second motor is supported on the second case with a second bearing,
wherein the positioning portion includes a first surface of the intermediate case that faces the second case, a columnar member, and a second surface of the second case that faces the first surface, and has a first recess that is formed in the first surface and a second recess that is formed in the second surface, the columnar member having ends each of which is received in a corresponding one of the first recess and the second recess,
wherein the first surface and the second surface are positioned in such a manner as to be spaced apart from each other, and
wherein a position of the first joint portion is located closer to the second case than a position of the first bearing is in axial directions of the first rotary shaft and the second rotary shaft.

5. A case structure to accommodate a driving apparatus including a first motor and a second motor, the case structure comprising:
a first case to which a stator of the first motor is to be attached, the first motor including a first rotary shaft, a rotor rotatable around the first rotary shaft, and the stator disposed to surround an outer circumferential surface of the rotor;
a second case joined to the first case;
a first joint portion including a first end surface of the first case and an end surface of the second case that are directly joined to each other;
an intermediate case disposed on an inner diameter side of the first joint portion and attached to a stator of the second motor and to the first case, the second motor including a second rotary shaft coaxial with the first rotary shaft, a second rotor rotatable around the second rotary shaft, and the stator disposed to surround an outer circumferential surface of the second rotor; and
a positioning portion at which the intermediate case is positioned with respect to the second case;
a first end portion of the second rotor or the second rotary shaft of the second motor being supported on the intermediate case with a first bearing, and a second end portion of the second rotor or the second rotary shaft of the second motor being supported on the second case with a second bearing, wherein the first end surface of the first case and the end surface of the second case are in direct contact with each other at the first joint portion.

6. The case structure according to claim 5,
wherein the positioning portion includes a first surface of the intermediate case that faces the second case, a columnar member, and a second surface of the second case that faces the first surface, and has a first recess that is provided in the first surface and a second recess that is provided in the second surface, the columnar member having ends each of which is received in a corresponding one of the first recess and the second recess, and
wherein the first surface and the second surface are positioned in such a manner as to be spaced apart from each other.

7. The case structure according to claim 6, further comprising:
a second joint portion that is provided by joining a second end surface of the first case and an end surface of the intermediate case together.

8. A case structure to accommodate a driving apparatus including a first motor and a second motor, the case structure comprising:
a first case to which a stator of the first motor is to be attached, the first motor including a first rotary shaft, a rotor rotatable around the first rotary shaft, and the stator disposed to surround an outer circumferential surface of the rotor;
a second case joined to the first case;
a first joint portion including a first end surface of the first case and an end surface of the second case that are directly joined to each other;
an intermediate case disposed on an inner diameter side of the first joint portion and attached to a stator of the second motor and to the first case, the second motor including a second rotary shaft coaxial with the first rotary shaft, a second rotor rotatable around the second rotary shaft, and the stator disposed to surround an outer circumferential surface of the second rotor;
a positioning portion at which the intermediate case is positioned with respect to the second case; and
a second joint portion that is provided by joining a second end surface of the first case and an end surface of the intermediate case together;
a first end portion of the second rotor or the second rotary shaft of the second motor being supported on the intermediate case with a first bearing, and a second end portion of the second rotor or the second rotary shaft of the second motor being supported on the second case with a second bearing,
wherein the positioning portion includes a first surface of the intermediate case that faces the second case, a columnar member, and a second surface of the second case that faces the first surface, and has a first recess that is provided in the first surface and a second recess that is provided in the second surface, the columnar member having ends each of which is received in a corresponding one of the first recess and the second recess,
wherein the first surface and the second surface are positioned in such a manner as to be spaced apart from each other, and
wherein a position of the first joint portion is located closer to the second case than a position of the first bearing in axial directions of the first rotary shaft and the second rotary shaft.

9. A case structure for a driving apparatus comprising:
a first motor that includes a first rotary shaft, a rotor that rotates along with the first rotary shaft, and a stator that is disposed over an outer circumferential side of the rotor;
a second motor that includes a second rotary shaft that is disposed so as to be coaxial with the first rotary shaft, a rotor that rotates along with the second rotary shaft, and a stator that is disposed over an outer circumferential side of the rotor;
a case in which the first motor and the second motor are accommodated; and
a second joint portion including a second end surface of the first case and an end surface of the intermediate case that are directly joined together, the second joint portion being spaced from the first joint portion in an axial direction defined by the first rotary shaft,
wherein the case includes
a first case to which the stator of the first motor is attached,
a second case that is joined to the first case,
a first joint portion including a first end surface of the first case and an end surface of the second case that are directly joined to each other,
an intermediate case that is attached to the first case and disposed on an inner diameter side of the first joint portion, and
a positioning portion at which the intermediate case is positioned with respect to the second case,
wherein the stator of the second motor is attached to the intermediate case, and
wherein a first end portion of the rotor or the second rotary shaft of the second motor is supported on the intermediate case with a first bearing, and a second end portion of the rotor or the second rotary shaft of the second motor is supported on the second case with a second bearing.

10. The case structure according to claim 1,
wherein the first end surface of the first case and the end surface of the second case are directly joined to each other by a fastener.

11. A case structure to accommodate a driving apparatus including a first motor and a second motor, the case structure comprising:
a first case to which a stator of the first motor is to be attached, the first motor including a first rotary shaft, a rotor rotatable around the first rotary shaft, and the stator disposed to surround an outer circumferential surface of the rotor;
a second case joined to the first case;
a first joint portion including a first end surface of the first case and an end surface of the second case that are directly joined to each other;
an intermediate case disposed on an inner diameter side of the first joint portion and attached to a stator of the second motor and to the first case, the second motor including a second rotary shaft coaxial with the first rotary shaft, a second rotor rotatable around the second rotary shaft, and the stator disposed to surround an outer circumferential surface of the second rotor;
a positioning portion at which the intermediate case is positioned with respect to the second case; and
a second joint portion including a second end surface of the first case and an end surface of the intermediate case that are directly joined together, the second joint portion being spaced from the first joint portion in an axial direction defined by the first rotary shaft;

a first end portion of the second rotor or the second rotary shaft of the second motor being supported on the intermediate case with a first bearing, and a second end portion of the second rotor or the second rotary shaft of the second motor being supported on the second case with a second bearing.

12. The case structure according to claim 5,
wherein the first end surface of the first case and the end surface of the second case are directly joined to each other by a fastener.

* * * * *